United States Patent [19]

Buchwald et al.

[11] Patent Number: 4,770,714

[45] Date of Patent: Sep. 13, 1988

[54] SOLVENT MIXTURE CONTAINING 2,2,2-TRIFLUOROETHANOL FOR USE AS A CLEANING COMPOSITION

[75] Inventors: Hans Buchwald, Hanover; Boreslaus Raschkowski, Wiedensahl; Dieter Singer, Laatzen, all of Fed. Rep. of Germany

[73] Assignee: Kali-Chemie Aktiengesellschaft, Hanover, Fed. Rep. of Germany

[21] Appl. No.: 25,974

[22] Filed: Mar. 16, 1987

[30] Foreign Application Priority Data

Mar. 20, 1986 [DE] Fed. Rep. of Germany ....... 3609426

[51] Int. Cl.$^4$ .......................... B08B 3/08; C11D 7/30; C11D 7/50
[52] U.S. Cl. ...................... 134/40; 252/162; 252/171; 252/DIG. 9
[58] Field of Search .............. 252/171, 153, 67, 194, 252/364, 162, DIG. 9; 134/40, 31; 568/842

[56] References Cited

U.S. PATENT DOCUMENTS

| | | | |
|---|---|---|---|
| 3,509,061 | 4/1970 | Zisman | 252/171 |
| 3,722,211 | 3/1973 | Conner | 60/36 |
| 3,753,345 | 8/1973 | Cassidy | 60/36 |
| 3,957,672 | 5/1976 | Zisman | 252/171 |
| 4,465,610 | 8/1984 | Enjo | 252/67 |
| 4,530,776 | 6/1985 | Hisamoto | 252/153 |

FOREIGN PATENT DOCUMENTS 0088485 7/1981 Japan .

Primary Examiner—Paul Lieberman
Assistant Examiner—Kathleen Markowski
Attorney, Agent, or Firm—Foley & Lardner, Schwartz, Jeffery, Schwaab, Mack, Blumenthal & Evans

[57] ABSTRACT

Solvent mixtures of 2,2,2,-trifluoroethanol and halogenated hydrocarbons containing 1 to 3 carbon atoms or polyfluorinated aromatic hydrocarbons in a weight ratio of from 1:90 to 99:1, and optional additive alcohols and/or stabilizers, and uses of such mixtures in cleaning processes, vapor degreasing, removal of adsorbed water from the surfaces of solid objects, and as working fluids for a Rankine process or heat pump.

9 Claims, No Drawings

SOLVENT MIXTURE CONTAINING 2,2,2-TRIFLUOROETHANOL FOR USE AS A CLEANING COMPOSITION

BACKGROUND OF THE INVENTION

The present invention relates to solvent mixtures formed of chlorinated and/or fluorinated hydrocarbons and fluoroalcohols.

Besides pure chlorinated and/or fluorinated hydrocarbons, hereinafter referred to as halogenated hydrocarbons or HHC, it is already known to use mixtures of two or more halogenated hydrocarbons for diverse industrial processes such as cleaning processes, vapor degreasing, and drying solid surfaces, as well as working fluids for thermodynamic processes in which thermal energy is transferred (heat pumps) or converted into higher value forms of energy (Rankine processes). Such mixtures can be either azeotropic or azeotrope-like in nature, or they can be non-azeotropic. The term "azeotrope-like" is intended to refer to mixtures which throughout a large range of concentrations boil at a substantially constant temperature (variation in the boiling temperature of less than 5° C.) and which therefore behave for practical purposes similar to an azeotrope.

The known mixtures are still capable of improvement in their technical characteristics, and there therefore exists a need for new solvent mixtures with new, special characteristics.

SUMMARY OF THE INVENTION

It is the object of the invention to provide new solvent mixtures with useful characteristics.

A further object of the invention is to provide processes for using such new solvent mixtures.

These objects are achieved by providing a mixture comprising 2,2,2-trifluoroethanol and a halogenated hydrocarbon having from 1 to 3 carbon atoms selected from the group consisting of chlorinated hydrocarbons, fluorinated hydrocarbons and chlorofluorohydrocarbons, or a polyfluorinated aromatic hydrocarbon; the weight ratio of 2,2,2-trifluoroethanol to halogenated hydrocarbon or polyfluorinated aromatic hydrocarbon being from 1:90 to 99:1.

DETAILED DESCRIPTION OF PREFERRED EMBODIMENTS

The invention relates to mixtures which are characterized by a content of 2,2,2-trifluoroethanol (TFE) and a halogenated hydrocarbon selected from the group consisting of chlorinated and/or fluorinated hydrocarbons with 1 to 3 carbon atoms (HHC) and polyfluorinated, particularly perfluorinated, aromatic hydrocarbons (AFHC) and by a weight ratio of 2,2,2-trifluoroethanol to halogenated hydrocarbon or polyfluorinated aromatic hydrocarbon of 1:90 to 99:1.

In one subvariant of the invention, the mixtures are characterized by a weight ratio of 2,2,2-trifluoroethanol to halogenated hydrocarbon or polyfluorinated aromatic hydrocarbon of 1:50 to 1:1.5.

In another subvariant of the invention, the mixtures are characterized by a weight ratio of 2,2,2-trifluoroethanol to halogenated hydrocarbon or polyfluorinated aromatic hydrocarbon of 1:1 to 99:1.

Suitable halogenated hydrocarbons or polyfluorinated aromatic hydrocarbons include those which boil at standard pressure in the temperature range from +20° C. to +150° C. These are well known as such to persons skilled in the art. For example, suitable materials are listed in ISO/DIS 817 or other standard reference works.

Particularly preferred are mixtures, especially binary mixtures, which contain 2,2,2-trifluoroethanol and a halogenated hydrocarbon selected from the group consisting of dichloromethane, trichloromonofluoromethane (R11), 1,1,1-trichloroethane, tetrachloro-1,2-difluoroethane (R112), 1,1,2-trichloro-trifluoroethane (R113), tetrachloromonofluoroethane (R121), and trichlorodifluoroethane (R122).

Another group of preferred mixtures comprises 2,2,2-trifluoroethanol and a polyfluorobenzene, particularly hexafluorobenzene, as the polyfluorinated aromatic hydrocarbon.

One group of special mixtures are those which contain 2,2,2-trifluoroethanol and trichloromonofluoromethane as a halogenated hydrocarbon in a predetermined weight ratio. Mixtures are particularly preferred which contain 2,2,2-trifluoroethanol and trichloromonofluoromethane in a weight ratio from 1:90 to 1:10, since such mixtures behave as azeotropes and boil in the range from about 21° to about 24° C. A more narrow boiling range is exhibited by mixtures which contain from 2 to 6 weight percent 2,2,2-trifluoroethanol and correspondingly from 98 to 94 weight percent trichloromonofluoromethane. The azeotropic mixture has a boiling point of about 22.7° C. and is characterized by the composition 4±0.2 weight % 2,2,2-trifluoroethanol and correspondingly 96±0.2 weight % trichloromonofluoromethane.

Another group of special mixtures are those which contain 2,2,2-trifluoroethanol and 1,1,2-trichlorotrifluoroethane as a halogenated hydrocarbon in a predetermined weight ratio. Mixtures are particularly preferred which contain 2,2,2-trifluoroethanol and 1,1,2-trichlorotrifluoroethane in a weight ratio of from 1:90 to 1:5, since such mixtures behave as azeotropes and boil in the range from about 42° to about 45° C. A more narrow boiling range is exhibited by mixtures which contain 10 to 14 weight % 2,2,2-trifluoroethanol and correspondingly 90 to 86 weight % 1,1,2-trichlorotrifluoroethane. The azeotropic mixture has a boiling point of about 43.0° C. and is characterized by the composition 11.9±0.2 weight % 2,2,2-trifluoroethanol and correspondingly 88.1±0.2 weight % 1,1,2-trichlorotrifluoroethane.

Insofar as tetrachloro-1,2-difluoroethane is utilized as the halogenated hydrocarbon, mixtures are preferred which contain up to about 5 weight % 2,2,2-trifluoroethanol. Mixtures with a higher 2,2,2-trifluoroethanol content form a one-phase system only at temperatures which are elevated with respect to room temperature.

The aforedescribed multicomponent mixtures or binary mixtures can be utilized directly as such. But they also can be utilized in production of more complex mixtures. The complex mixtures which then result, in which the weight ratio of 2,2,2-trifluoroethanol to halogenated hydrocarbon lies in the aforementioned predetermined ranges, are likewise considered to be within the scope of the invention.

Hydrocarbons which are liquid at room temperature, preferably gasoline fractions or heptanes such as n-heptane, are suitable as further components of such complex mixtures. Mixtures of 2,2,2-trifluoroethanol and halogenated hydrocarbon or polyfluorinated aromatic hydrocarbon with up to 10 weight % (computed with respect to the total mixture) of liquid hydrocarbon have proven to be very suitable. Mixtures according to the invention based on tetrachloro-1,2-difluoroethane can contain up to about 7 weight % n-heptane in addition to up to about 6 weight % 2,2,2-trifluoroethanol, with the balance being tetrachloro-1,2-difluoroethane.

Besides 2,2,2-trifluoroethanol and halogenated hydrocarbon or polyfluorinated aromatic hydrocarbon, preferred complex mixtures additionally contain one or more alcohols selected from the group consisting of methanol, ethanol, i-propanol, n-propanol, n-butanol, sec.-butanol, and tert.-butanol. The proportion of alcohol in complex mixtures can vary within broad ranges. In the broadest form, the alcohol can amount to from 0.1 to 50 weight % (computed with respect to the total mixture). In one preferred embodiment the complex mixture contains 1 to 10 weight % alcohol. The addition of the aforementioned alcohols makes it possible in particular to increase the concentration of 2,2,2-trifluoroethanol in the TFE/R112 system above the aforementioned concentration limit without obtaining a two-phase system at room temperature. For example, a mixture of about 12.5 weight % i-propanol, 50 weight % 2,2,2-trifluoroethanol and 37.5 weight % tetrachloro-1,2-difluoroethane (computed with respect to the total mixture) is a clear solution at room temperature.

Known additives can be incorporated into either the binary mixtures of 2,2,2-trifluoroethanol and halogenated hydrocarbons or also the complex mixtures. One group of known additives are stabilizers. This group includes such compounds which prevent an undesired reaction by components of the mixture with each other or with other reactants, such as, for example, atmospheric oxygen, water, metal, etc. Examples of known stabilizers include nitroalkanes, particularly nitromethane or nitroethane, alkylene oxides, preferably butylene oxide, or preferably branched alkynol, such as for example 2-methyl-butyn-3-ol-2. These stabilizers can be used alone or in combinations with each other, whereby amounts from 0.01 to 6 weight %, in particular 0.05 to 1 weight %, are very suitable.

A further group of additives includes known compounds such as corrosion inhibitors, non-ionic or ionic emulsifiers, coloring agents, etc.

The aforedescribed compositions have numerous possibilities for use. One large area of use in the cleaning and/or vapor degreasing sector. In these known processes, the object to be cleaned is immersed in one or more stages in a liquid and/or vaporized cleaning mixture or is sprayed with a liquid cleaning mixture. In known processes, the cleaning effect can be increased by utilizing elevated temperatures and/or ultrasonic energy and/or agitation. Likewise, an improvement in the cleaning effect through mechanical means, for example brushes, is known.

For example, the electronics industry utilizes primarily organic resin fluxes for soldering operations. Excess amounts of these organic compounds must be removed from circuit boards after the soldering operation. This is done with organic solvents which are compatible with the circuit boards and the electronic components, i.e. the solvent may not react therewith. The resin fluxes are mixtures of polar and non-polar compounds and often contain special activators. Fluorinated hydrocarbons alone, which are non-polar, are not effective to remove the polar components of the resin. Known mixtures which in addition to fluorinated hydrocarbons contain an alcohol are similarly not in a position to completely remove particular special fluxed with high activator contents. Mixtures according to the invention, however, can remove both polar and also non-polar components and are therefore more widely effective as removing agents for resin fluxes, particularly those with high activator contents. Binary mixtures or complex mixtures which contain 2,2,2-trifluoroethanol and at least one halogenated hydrocarbon selected from the group dichloromethane, trichloromonofluoromethane and 1,1,2-trichlorotrifluoroethane, and optionally additionally alcohol and/or additive, are particularly suitable for this application. Mixtures having a 2,2,2-trifluoroethanol to halogenated hydrocarbon weight ratio of from 1:90 to 1:1.5 are preferably utilized for this type of application.

Thus circuit boards with or without attached circuit components (particularly SMD-equipped boards) can be cleaned without any problem with the binary or complex mixtures according to the invention even when fluxes with a high activator content are used, without formation of the "white spots" which may occur when conventional cleaning agents are used.

Another area in which the mixtures according to the invention are particularly useful is the removal of water from solid surfaces. For this purpose a large number of processes are also known in the art which envision a one-stage or multi-stage treatment of the objects to be dried, similar in principle to those described above for cleaning.

The compositions according to the invention displace the water with a solvent film which evaporates without leaving a residue on the objects to be dried. The mixtures mentioned above as particularly well suited for cleaning processes are also preferentially suitable for drying.

The new azeotropic or azeotrope-like mixtures of 2,2,2-trifluoroethanol and trichloromonofluoromethane or 2,2,2-trifluoroethanol and 1,1,2-trichlorotrifluoroethane according to the invention are also desired systems for refrigerants and lubricants, since the compositions have a low surface tension, a low viscosity and a high density of about 1.4 to 1.7 $g/cm^3$ at 20° C. The foregoing physical characteristics are those which are desired for lubricant uses. For example, compositions according to the invention are desired when the mixtures are used as lubricants in metalworking machines, for example, in boring, milling, turning, cutting threads, stamping or the like, where a residue-free surface is necessary. For these uses in particular known lubricant additives can also be incorporated. For example, suitable additives are described in DE-OS 33 42 852 or DE-OS 33 35 870, the disclosures of which are incorporated herein by reference.

The low surface tension of the compositions according to the invention makes them particularly suitable for cleaning of capillary systems. The high wetting capacity and density of the binary mixtures of the invention, optionally in admixture with isopropanol, ethanol or mixtures of the same, makes these compositions good cleaning agents for capillary systems.

The binary or complex mixtures according to the invention can also be used, for example, as follows:
 for cleaning small parts or particulate material (preferably in a closed installation)
 for removing or stripping coatings or lacquers
 as a solvent and/or additive for solvents for chemical cleaning as a special solvent, extraction agent and/or recrystallization medium in the chemical and pharmaceutical industries as a medium for dissolving, softening, surface treating, such as, for example, etching or delustering of synthetic materials such as, for example, polyamides, polymethacrylates, polyformaldehydes, polyacrylonitriles etc.

A further significant area of utilization for binary or complex mixtures according to the invention is as working fluids in thermodynamic processes, in which thermal energy is transferred or converted into higher value energy forms.

In the processes known as Rankine processes, for example, electrical energy is generated by means of expansion turbines or piston machines. In such processes, mixtures according to the invention can be utilized with advantage—without incorporation of alcohol however—particularly mixtures formed of 2,2,2-trifluoroethanol and trichloromonofluoromethane, mixtures formed of 2,2,2-trifluoroethanol and 1,1,2-trichlorotrifluoroethane, and mixtures formed of 2,2,2-trifluoroethanol and polyfluorinated aromatic hydrocarbon. For this application, mixtures are preferred which the weight ratio of 2,2,2-trifluoroethanol to halogenated hydrocarbon or polyfluorinated aromatic hydrocarbon is preferably from 1:1 to 99:1, in particular from 9:1 to 50:1. For mixtures of 2,2,2-trifluoroethanol and polyfluorinated aromatic hydrocarbon, polyfluorinated aromatic hydrocarbon rich mixtures having a 2,2,2-trifluoroethanol to polyfluorinated aromatic hydrocarbon ratio of 1:1 to 1:90 are suitable.

For utilization as the working fluid in heat pumps, preferably high temperature heat pumps or absorption heat pumps or thermal converters as well as cooling media in absorption coolers, the just mentioned mixtures are likewise preferred.

European patent no. EP-A-0 120 319 discloses general mixtures of (a) a fluoroalcohol corresponding to the general formula $X(C_nF_{2n})C_mH_{2m}OH$ wherein X is F or H, m is 1 to 3, n is 1 to 10, together with (b) a halogenated or non-halogenated hydrocarbon. Further, U.S. Pat. No. 3,509,061 discloses mixtures for drying solid surfaces which in addition to a perhalogenated alkane contain 0.02 to 1 weight % of a fluoroalcohol corresponding to the formula $F(CF_2)_mCHROH$ wherein m is 1 to 11, and R is H and $C_1$- to $C_{11}$-perfluoroalkyl. As concrete examples of compounds which fall under the given general formula for fluoroalchols, a whole series of fluorine containing alcohols are mentioned, but not 2,2,2-trifluoroethanol. The mixtures according to the invention are therefore novel. It was also surprising that the mixtures according to the invention are very well suited for the aforementioned uses, since the mixtures disclosed in European patent no. EP-A-0 120 319 are used only for removal of wax. By means of the mixtures according to the invention, new solutions are made possible for problems in a wide variety of fields of use. In particular, mixtures of 2,2,2-trifluoroethanol and trichloromonofluoromethane or 1,1,2-trichlorotrifluoroethane do not exhibit any flash point according to the closed crucible method at 2,2,2-trifluoroethanol concentrations up to that of the azeotrope throughout the entire temperature range up to the boiling point. The mixtures disclosed in U.S. Pat. No. 3,509,061 are, for example, not suitable for the removal of activator-containing fluxes, since when they are used and 2,2,2-trifluoroethanol is selected as the fluoroalcohol, "white spots" arise.

The following examples are intended to further describe the invention without limiting its scope. Unless otherwise indicated, percentages are always weight percent.

EXAMPLE 1

Cleaning of Circuit Boards

Cleaning tests were carried out in a conventional, commercial, two- or three-chamber cleaning installation with circuit boards which were contaminated with strong activator containing soldering flux. The test conditions are reproduced in Table 1.

TABLE 1

| No. | Mixture | Cleaning Conditions | Result |
|---|---|---|---|
| 1. | R113 + TFE 88.1% + 11.9% | 2-bath, 3 min. ultrasonic 1 min. vapor degreasing | + |
| 2 | Azeotrope R113 + MeOH* | as in Test 1 | − |
| 3 | Azeotrope R113 + EtOH* | as in Test 1 | − |
| 4 | Azeotrope R113 + i-PrOH* | as in Test 1 | − |
| 5 | R113 + i-PrOH* 65% + 35% in Bath 1; R113 in Bath 2 & 3 | 3-bath, 3 min. ultrasonic 1 min. ultrasonic 1 min. vapor degreasing | − |
| 6 | R113 + EtOH* 65% + 35% | as in Test 5 | − |
| 7 | R11 + TFE 96.0% + 4.0% | as in Test 1 | + |
| 8 | R113 + TFE 60% + 40% in Bath 1; Bath 2 & 3 as in No. 1 | as in Test 5 | + |
| 9 | R113 + TFE + EtOH* + CH₃NO₂ 83.4% + 11.3% + 5.0% + 0.3% | as in Test 1 | + |
| 10 | R112 + TFE + i-PrOH,* 85% + 5.0% + 10% | as in Test 1 | + |
| 11 | R113 + TFE 99% + 1% | as in Test 1 | − |
| 12 | R11 + TFE 99% + 1% | as in Test 1 | − |

*MeOH = methanol, EtOH = ethanol, i-PrOH = isopropanol

In the tests characterized with a "+" in the results column, a very good cleaning result was achieved and "white spots" were not formed. In the tests characterized with a "−", "white spots" were formed.

It can clearly be seen that the mixtures according to the invention (Test Nos. 1 and 7 through 10) are superior to mixtures according to the state of the prior art (Test Nos. 2 through 6). Also the Tests 11 and 12, in which mixtures were utilized, the composition of which was chosen in accordance with U.S. Pat. No. 3,509,061, did not yield satisfactory results.

EXAMPLE 2

Cleaning of Loose Material

Loose material (transistor caps) was cleaned with 1,1,2-trichlorotrifluoroethane and 2,2,2-trifluoroethanol (88.1%+11.9%) in a two chamber installation (3 minutes ultrasonic, 1 minute vapor degreasing) to remove drawing oils. After the treatment, the loose material was unobjectionably clean.

EXAMPLE 3

Drying of Solid Surfaces

Optical lenses were treated with 1,1,2-trichlorotrifluoroethane and 2,2,2-trifluoroethanol (88.1%+11.9%) in a two chamber dry installation (1 minute spraying, 1 minute vapor). Fully dry lenses resulted which exhibited no residues on their surfaces.

EXAMPLE 4

Etching of Synthetic Material

Molded pieces of (a) polymethacrylate (Plexiglass) or (b) polyamide (Ultramid®) were immersed in a mixture of 1,1,2-trichlorotrifluoroethane and 2,2,2-trifluoroethanol (88.1%+11.9%). In test (a) a clearly noticeable attack was apparent after 5 minutes, and a strong clouding of the surface after 2 hours. The originally transparent molded article was completely matt. In test (b) a strong surface attack appeared after only 3 minutes.

EXAMPLE 5

Kaury-Butanol Number

The following Kaury-Butanol numbers were determined in the conventional manner:

| Mixture | Kaury-Butanol Number |
| --- | --- |
| R113 + TFE 88.1% + 11.9% | 17 |
| R11 + TFE 96.0% + 4.0% | 37 |

It is surprising that the mixtures according to the invention, in spite of their low Kaury-Butanol numbers in comparison to the azeotropes trichloromonofluoromethane/ethanol (KB=70), 1,1,2-trichlorotrifluoroethane/ethanol (KB=29), 1,1,2-trichlorotrifluoroethane/isopropanol (KB=28), or trichloromonofluoromethane/isopropanol (KB=68)show an improved solvent action.

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with respect to the appended claims and equivalents.

What is claimed is:

1. An azeotrope-like cleaning composition which consists essentially of 2,2,2-trifluoroethanol and 1,1,2-trichlorotrifluoroethane(=R113) or trichlorofluoromethane(=R11) wherein the 1,1,2-trichlorotrifluoroethane content is from 86 to 90 weight percent and the 2,2,2-trifluoroethanol content is from 10 to 14 weight percent, or the trichlorofluoromethane content is from 94 to 98 weight percent and the 2,2,2-trifluoroethanol content is from 2 to 6 weight percent.

2. An azeotrope-like cleaning composition according to claim 1, having a boiling range of from about 42° to about 45° C. and consisting essentially of from 10 to 14 weight percent of 2,2,2-trifluoroethanol and 86 to 90 weight percent of 1,1,2-trichlorotrifluoroethane.

3. An azeotrope-like cleaning composition according to claim 2, which contains 11.9±0.2 weight percent of 2,2,2-trifluoroethanol.

4. An azeotrope-like cleaning composition according to claim 1, having a boiling range of from about 21° to about 24° C. and consisting essentially of from 2 to 6 weight percent of 2,2,2-trifluoroethanol and from 94 to 98 weight percent of trichlorofluoromethane.

5. An azeotrope-like cleaning composition according to claim 4, which contains 4.0±0.2 weight percent of 2,2,2-trifluoroethanol.

6. A method of removing resin fluxes containing polar components from solid objects which comprises treating said objects with a cleaning composition consisting essentially of:
    (a) 50 to 100 weight percent with respect to the total composition of a mixture of 2,2,2-trifluoroethanol and a halogenated hydrocarbon selected from the group consisting of 1,1,2-trichlorotrifluoroethane(=R113), trichlorofluoromethane(=R11) and tetrachloro-1,2-difluoroethane(=R112), wherein the weight ratio of 2,2,2-trifluoroethanol to said halogenated hydrocarbon in said mixture is from 1:50 to 1:1.5;
    (b) 0 to 50 weight percent with respect to the total composition of $C_1$–$C_4$ alkyl alcohol, and
    (c) 0 to 6 weight percent with respect to the total composition of a stabilizer.

7. A method according to claim 6, wherein in said cleaning composition the 2,2,2-trifluoroethanol content of mixture (a) is from 2 to 14 weight percent with respect to said mixture (a).

8. A method according to claim 6, wherein said cleaning composition consists essentially of an azeotrope-like mixture of 2,2,2-trifluoroethanol and 1,1,2-trichlorotrifluoroethane having a boiling range of from about 42° to about 45° C. and which contains from 10 to 14 weight percent of 2,2,2-trifluoroethanol.

9. A method according to claim 6, wherein the cleaning composition consists essentially of an azeotrope-like mixture of 2,2,2-trifluoroethanol and trichlorofluoromethane having a boiling range of from about 21° to about 24° C. and which contains from 2 to 6 weight percent of 2,2,2-trifluoroethanol.

* * * * *